Jan. 5, 1954
R. P. LOWE
2,664,907
APPARATUS FOR PROPORTIONING FLOWS OF DIFFERENT MATERIALS
Filed Jan. 6, 1951
4 Sheets-Sheet 1
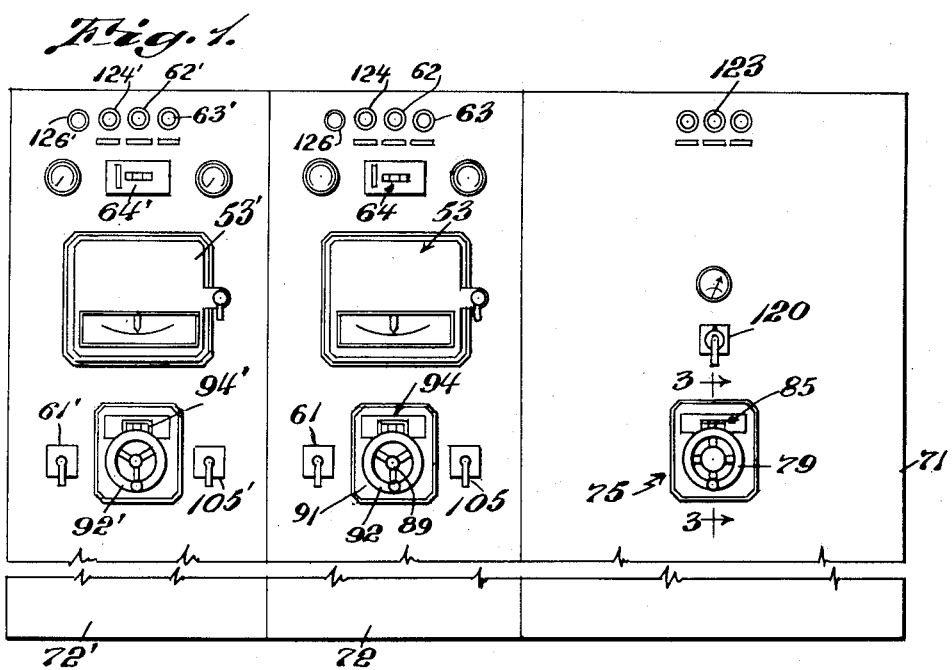
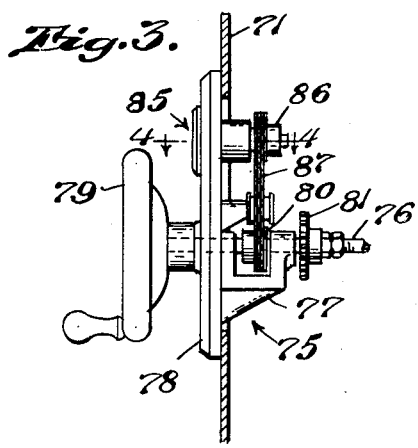
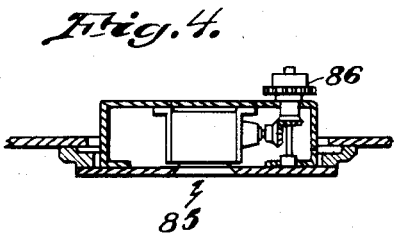
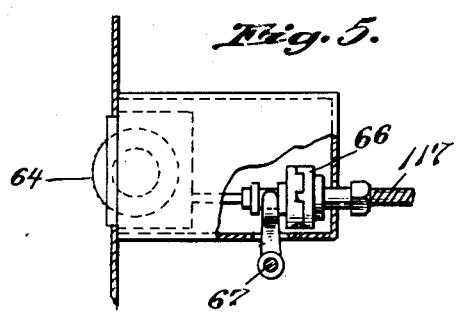
INVENTOR.
*Rudy Lowe*
BY
*Barlow & Barlow*
ATTORNEYS.

Jan. 5, 1954

R. P. LOWE 2,664,907

APPARATUS FOR PROPORTIONING FLOWS
OF DIFFERENT MATERIALS

Filed Jan. 6, 1951

INVENTOR.
Rudy Lowe
BY
Barlow & Barlow
ATTORNEYS.

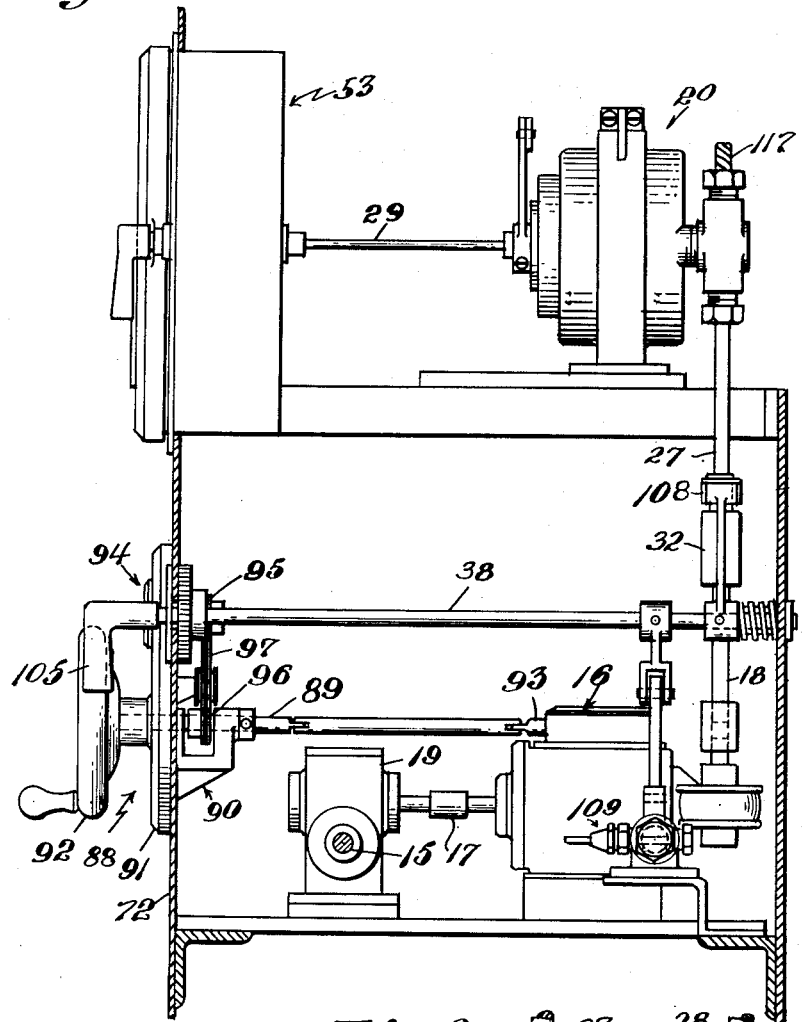
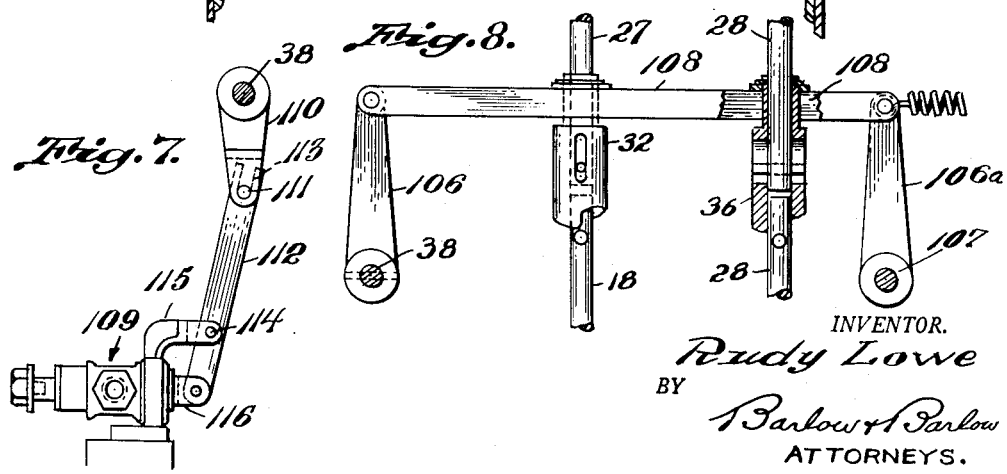

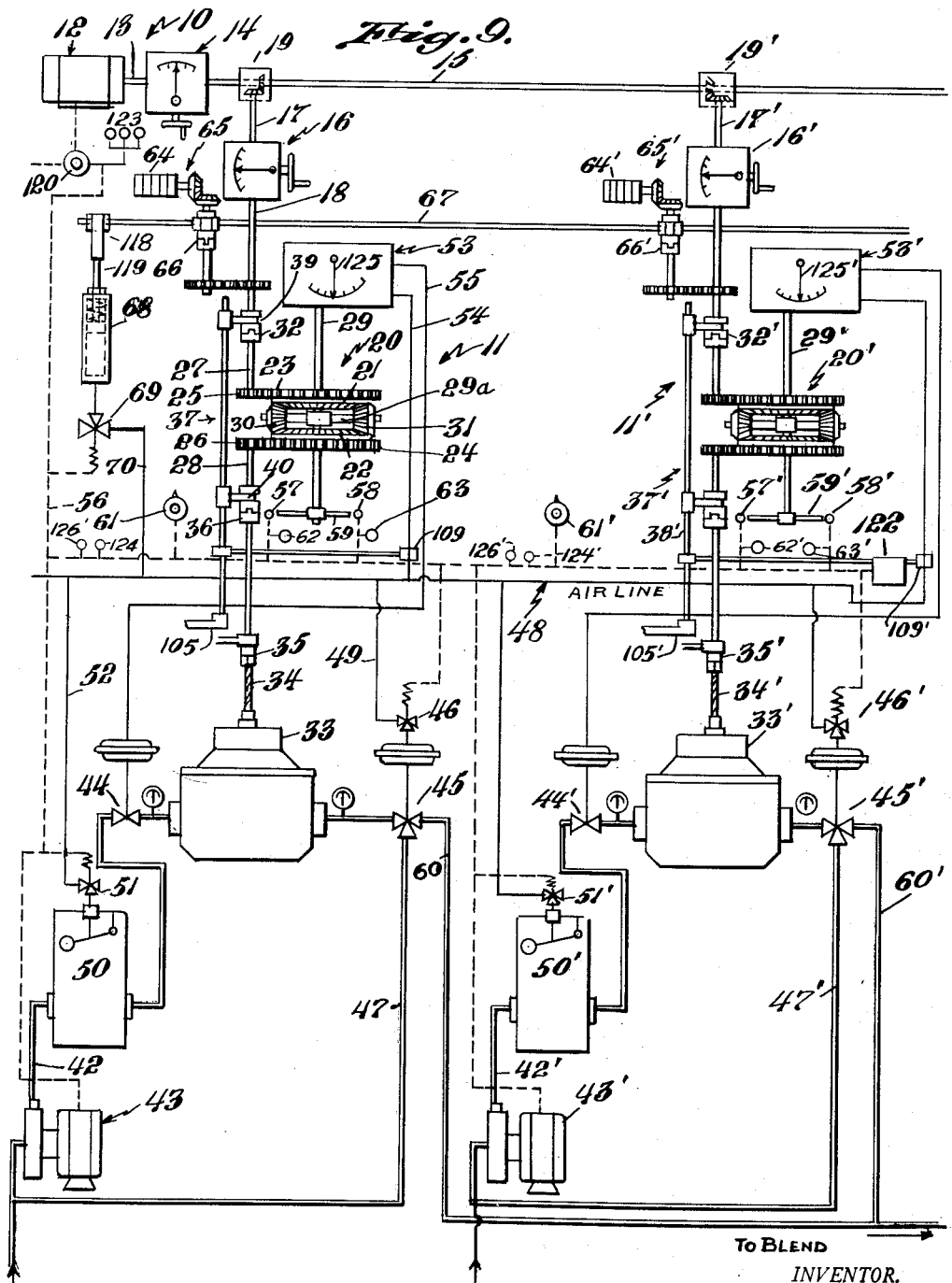

Patented Jan. 5, 1954

2,664,907

UNITED STATES PATENT OFFICE 2,664,907

APPARATUS FOR PROPORTIONING FLOWS OF DIFFERENT MATERIALS

Rudy P. Lowe, Cranston, R. I., assignor to Proportioneers, Inc., a corporation of Rhode Island Application January 6, 1951, Serial No. 204,780

13 Claims. (Cl. 137—100)

This invention relates to a device for delivering two or more liquids simultaneously in definite quantity proportions to each other which can be varied at will.

In the blending of synthetic products prior to packaging or shipment such as lubricating oils, additives, synthetic fuels and the like, there is a demand for the highest possible accuracy as well as completely automatic operation in component proportioning. This requirement has not been fully recognized in prior devices as far as I am aware and all are overcome in my improved device.

The object of the invention is to provide a device of the above character that will be positive, completely automatic, accurate, reliable in operation, quickly adjustable to deliver different quantity proportions as desired within the close tolerances which will provide an accurate proof of performance on individual totalizers without delivering finished end product and which will recirculate all components and cut out the totalizers if for any reason any one liquid stops, or there is a mechanical failure in the equipment. On rectification of the failure, the device will automatically go back in operation, restoring the entire shortage or subtracting the overage so that the integrated demands of the respective pacing units will be completely satisfied in terms of correctly proportioned finished product.

My device applies to two or a plurality of liquids consisting essentially in the use of a constant speed motor preferably synchronous to provide a constant speed driving means for a master rate controller adjustable from a maximum through "0" and as described in Patent #2,405,957. This variable speed device determines the number of rotations per unit of time made by a common shaft from which are driven the respective pacing units for the various components.

Heretofore, it has been proposed to mix two liquids by the use of a suitable differential whose primary shafts are caused to rotate by the flow of the respective liquids and whose secondary member actuates a valve or other control device controlling the flow of one of the liquids so that it will always flow in the desired proportion to the other liquid. Likewise several liquids may be added to a primary liquid by employing a differential for each added liquid and causing one primary shaft of each differential to be actuated by the primary liquid and the other primary shaft of each differential to be actuated by the liquid to be added while the secondary member of each differential actuates a valve or other control device controlling the flow of the added liquid so that it will always be delivered to the primary liquid in the desired proportion. Also, it has been proposed to drive a common shaft with a plurality of differentials, one for each liquid to be mixed, each having its primary shaft driven from the common shaft and with the second primary shaft of each of these differentials driven by the rotatable shaft of a meter through which the respective liquid passes. The secondary member of each differential is caused to operate a control valve in the flow line carrying the liquid connected with each respective differential. The proportions are arranged by selecting the gearing between the common shaft and the primary of each differential or changed by changing this gearing. Under the first mentioned flow control there is a lag in the secondary flow in adjusting itself in the establishing of a stable condition in the said main flow. Under the second condition much time must be spent in properly adjusting each flow line to provide the desired proportion. Further, no means have ever been proposed, as far as I am aware, for making a test run without involving the actual passing of material through the apparatus.

An object of the invention is to provide an apparatus for proportioning the quantities of a plurality of different materials in which each material will be supplied in relation to a unit quantity of the combined composition of said materials.

Another object of the invention is to provide an apparatus for proportioning the quantities of a plurality of different materials by means of a mechanical rotary pacing system which will represent the combined materials.

A more specific object of the invention is to provide an apparatus for proportioning the quantities of a plurality of different materials in which each material will be supplied in a percentage to the total quantity of said materials based upon a pacing rotary movement which will be unity for the combined materials.

Another object of the invention is to provide an apparatus for proportioning a plurality of different materials which is so constructed as to establish a linear relation between the control setting and the percent composition in the blend of materials.

Another object of the invention is to provide an apparatus for proportioning a plurality of different materials which is so constructed as to provide a pacing system with an independent master control which will control the production rate without disturbing the proportion of the composition.

Another object of the invention is to provide an apparatus for proportioning a plurality of different materials which is so constructed as to provide an accurate blending of the accumulated several materials at any instant during operation.

Another object of the invention is to provide an apparatus for proportioning a plurality of different materials to make a blended composition which is so constructed as to minimize loading of the flow control units so as to better maintain an accurate flow control.

Another object of the invention is to provide an apparatus for proportioning a plurality of different materials to make a blended composition which is so constructed that the proportions of material may be quickly and readily changed for varying the composition of the combined material.

Another object of the invention is to provide an apparatus for proportioning a plurality of different materials to make a blended composition which is so constructed as to provide for automatically recirculating all materials upon the failure of the flow of any material to conform to a predetermined flow requirement and to automatically re-start the blending operation when said failure has been corrected and to then make up the amount of material lost in the temporary failure of said flow of material.

Another object of the invention is to provide an apparatus for proportioning a plurality of different materials to make a blended composition which is so constructed as to provide for recirculating said materials for stabilizing the same and for checking the composition of the blend without combining the materials.

Another object of the invention is to provide an apparatus for proportioning a plurality of different materials to make a blended composition which is so constructed as to operate to totalize numerically the quantity of materials with relation to the numerical rate of a pacing system and further operate to automatically disconnect the totalizing mechanism when the apparatus ceases to supply any one of the different materials.

Another object of the invention is to provide an apparatus according to the preceding object in which the pacing system may be calibrated by means of a totalizer mechanism and to provide a test position which will totalize flow while a recirculating of material is being made.

Another object of the invention is to provide an apparatus for proportioning a plurality of different materials to make a blended composition thereof which is so constructed as to control the flow of the materials based on the total quantity required in the blended composition.

With these and other objects in view, the invention consists of certain novel features of construction, as will be more fully described and particularly pointed out in the appended claims.

In the accompanying drawings:

Figure 1 is a front elevational view of the panels forming part of a preferred form of an apparatus for proportioning flows of different materials embodying my invention;

Figure 3 is a sectional view taken along line 3—3 of Figure 1 showing a fragmental portion of the apparatus;

Figure 4 is a sectional view taken substantially along line 4—4 of Figure 3;

Figure 5 is a side elevational view of a counter included in the apparatus shown partly in section;

Figure 6 is a sectional view showing the position of certain units of the apparatus and taken substantially along line 6—6 of Figure 2;

Figure 7 is a side elevational view of an automatic control means;

Figure 8 is an elevational view partly in section showing a clutch control means; and Figure 9 is a diagrammatic view of various units and instruments forming part of the apparatus shown in Figure 1.

Figure 2:
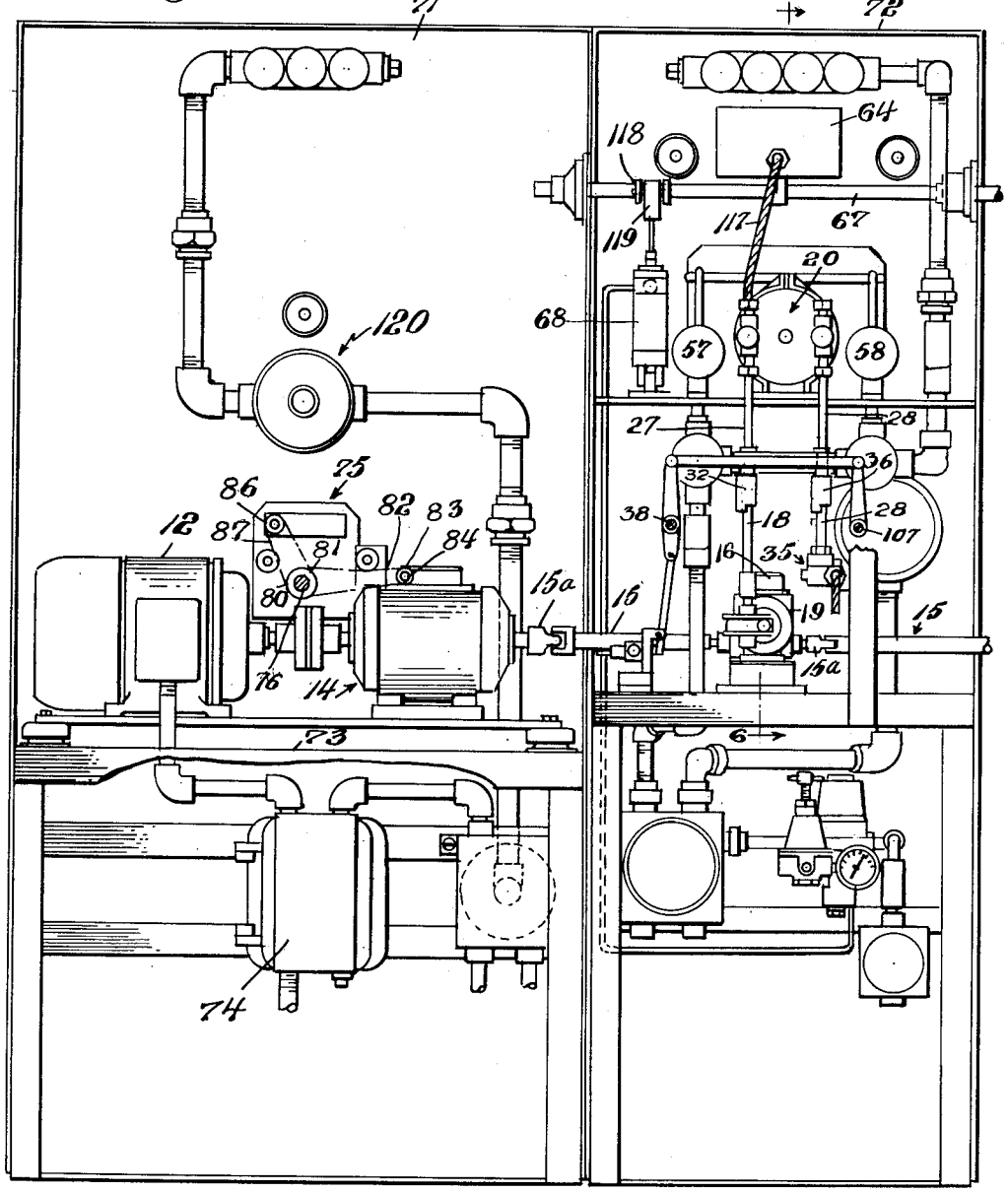
Figure 2 is a rear view of two of the panels shown in Figure 1 illustrating the relative positions of various instruments and unit structures of the apparatus.

Referring first to Figure 9, there is shown in this figure a general layout of the apparatus with the various instruments, valves, other elements and connections illustrated in a very general manner with no attempt made to show actual structure or proper relative positions of these parts as would appear in the actual set up of the apparatus. The apparatus comprises a master unit 10 and second component units 11, 11' which are similar to each other and in the present disclosure are adaptable for controlling two separate flows of liquid materials. A component unit such as 11 or 11' will be used for each material to be acted upon. Should there be four different materials in the composition made, then there would be four of such component units. As stated, the apparatus shown is particularly adapted to control a liquid material. However, the principle disclosed is adapted to be employed for the proportioning of dry materials or a combination of liquids and dry materials.

The master unit 10 comprises a master control power source, preferably an electric motor 12 which is directly connected by means of a shaft 13 to a master rate controller 14 which preferably comprises an infinitely variable stepless integrator transmission which is adjustable from zero to maximum. This integrator 14 may be of any suitable manufacture and its output shaft is suitably connected to a shaft 15 which is common to all component units 11, 11' and provides a mechanical rotary pacing arrangement therefor.

The component units 11, 11' are similar to each other and only one will be described. Like parts of the other component unit will be indicated by similar but primed numerals. A ratio controller or integrator 16 forming part of the component unit 11 is similar to the integrator 14 and has input and output shafts 17, 18 and is manually adjustable to produce the desired speed ratio between the said input and output shafts 17, 18. The input shaft 17 is connected to the shaft 15 by means of a device shown conventionally as consisting of a bevel gear connection 19 but which may be of any approved manufacture. Thus, the speeds of the shafts 17, 17' of the integrators 16, 16' are identical to each other and increasing or decreasing the speed of the said shaft 15 by means of the master integrator 14 will correspondingly increase or decrease the speed of shafts 17 and 17' in a like ratio.

A differential gearing mechanism designated generally 20 which may be of any approved manufacture and having a very high ratio of approximately three hundred and eighteen to one is illustrated conventionally as consisting of two bevel gears 21, 22 positioned to face each other with their center of rotation coincident. These gears 21, 22 are rotated in opposite directions by means of gear wheels 23, 24 which are engaged by pinions 25, 26 secured to the differential primary shafts 27 and 28. The secondary member of the differential is shown conventionally as a shaft 29 extending coincidental with the center of rotation of the gears 21, 22 and has attached thereto a bearing support 29a which extends radially between the gears 22, 23 and on the end portions of which bevel gear pinions 30, 31 are mounted for free rotation. These bevel pinions extend into engagement with the said gears 21, 22. As is well known in the art, the rotation of the two gears 21, 22 in opposite directions and at the same speed will produce zero movement in the secondary shaft 29 and a difference in speed between the said gears 21, 22 will cause the bevel pinions 30, 31 to revolve or be carried about the axes of rotation of the gears 21, 22 to rotate the secondary shaft 29. The primary shaft 27 of the differential gearing is connected to the output shaft 18 of the integrator 16 by means of a clutch connection 32 which may be manually controlled to connect or disconnect the said shafts 18, 27.

The flow of the component liquid to be proportioned is caused to flow through a flow meter 33 of a rotavane type in which a unit volume of liquid in passing through the meter produces a definite, constant angular movement of the meter shaft. The meter 33 may be positioned at any suitable location and its shaft may be connected by a flexible cable or shaft 34 to a connector 35 and from there to the primary shaft 28 of the differential by means of a clutch connection 36 which may be similar to the clutch connection 32 and similarly controlled to connect or disconnect the said shaft 28 to the connector 35. It is desirable that each clutch 32, 36 be operated simultaneously and to this end a clutch operating mechanism designated generally 37 is provided. This mechanism is shown diagrammatically by means of a rod 38 having a pair of clevises 39, 40 thereon which extend into engagement with the said clutches 32, 36, moving the rod 38 in a proper direction will connect or disconnect the clutches 32 and 36, depending upon the direction of movement of the rod 38.

Since a unit volume of liquid passed through the meter 33 is measured in terms of angular movement of the meter shaft regardless of the rate of the flow, the speed of the shaft 15 is made to represent unity of volume of the combined liquids at any instant during operation. With this basic arrangement, it is then only necessary in proportioning the flow of each liquid to adjust the said integrators 16, 16′ so as to produce the required speed of rotation of the output shaft 18 to the proper percentage of the speed of the input shaft 17. Thus, if unit 11 is to deliver twenty-five per cent of the total volume of the combined liquids, the integrator 16 will be adjusted to produce a speed in its output shaft 18 equal to twenty-five per cent of the speed of the input shaft 17 which must be matched or equalled by the speed of rotation of the meter shaft. Should the volume of liquid passing through the meter be greater or less than that required to produce rotation of the meter shaft at a speed equal to that set by the shaft 18, then a rotational movement will be had in the secondary shaft 29. This movement of the shaft 29 is made to control the flow of liquid through the meter 33 in a manner to be now described.

The liquid to be proportioned by unit 11 is moved through a pipe line indicated by solid lines 42, from a supply source (not shown) by means of a pump 43 which is electrically operated. The meter 33 is interposed in the pipe line 42 and an air-controlled, diaphragm-operated spring loaded valve 44 is positioned on the inflow side of the meter to control the flow of liquid through the said meter. A diaphragm-operated, three-way valve 45 is positioned to control the outflow of liquid from the meter 33. This valve 45 is in turn operated by means of a solenoid-controlled, air-operated spring loaded pilot valve 46. Should the air fail, the spring loading will cause the valve to move to a safe position. A return pipe line 47 extends from the valve 45 to the intake side of the pump 43 to recirculate the liquid in a manner to be hereinafter described. Air under pressure is supplied through an air line 48 and branch line 49 to the pilot valve 46. There is also interposed in the pipe line 42 an air eliminator 50 through which the flow of liquid is made to pass prior to being passed through the meter 33, whereby to remove air which may have entered the pipe line 42. The device 50 is also made to function as a blow back to clean the pipe line of a previous liquid so as to prevent contamination when formulations of composition are changed. For this function the device 50 is controlled by means of a solenoid-operated air valve 51 which is connected by a branch line 52 to the air line 48. This air valve 51 admits air at a high point in the recirculating system and serves to return any liquid in the recirculating lines to its source of supply.

An air controller instrument 53, which may be of any approved manufacture preferably of the anticipatory type with adjustment for sensitivity and automatic reset, operates instantaneously upon slight motion of the input shaft 29 and is connected by a branch line 54 to the air line 48 and by line 55 to the said valve 44. The shaft 29 of the differential is extended to be connected to the instrument 53 whereby the said instrument is operated to instantaneously control the flow of air therethrough. Should the flow of liquid through the meter 33 be greater than that required, the shaft 29 will be rotated in a direction to cause the instrument 53 to instantaneously increase the air supply to the valve 44 to move the same in a direction to reduce the flow of liquid through the meter 33. Likewise, if the flow through meter 33 is insufficient, the shaft 29 will be moved instantaneously in the opposite direction to cause the instrument to decrease the air supply to said valve 44 to permit the same to be moved in a direction to increase the flow through the meter 33.

The electrical circuit is indicated generally by dash lines 56 and includes high and low limit switches 57 and 58. These switches are positioned on either side of the shaft 29, at a location to be engaged by an arm 59 carried by the shaft 29 when moved rotatively a distance determined by the position of said switches. Upon the failure of the flow of liquid to reach the meter 33 in proper volume or upon failure of the air line permitting the closing of valve 44, the difference in speeds between the meter shaft and shaft 18 will produce an angular movement in shaft 29 to swing the arm 59 into engagement with the low limit switch 58 to operate the solenoid of pilot valve 46 to close valve 45 to the passage of liquid through the portion 60 of pipe line 42 beyond valve 45. The valve 45 will now be opened to branch pipe line 47 to recirculate the liquid through pump 43, line 42 and meter 33 during the period of said failure until corrected or the apparatus manually brought to rest. Should such failure be caused by an oversupply of fluid through the meter, the high limit switch 57 will be engaged, and in a similar manner, to place the apparatus on recirculation as above described. Upon correction or elimination of the cause of such failures and the supply returned to stable condition the apparatus will automatically return on blend. The flow of liquid through the meter during the period of becoming stabilized or at any such time it may increase or decrease will be made up in the amount loss or gain as meter 33 responds of liquid passed; that is, if the flow is insufficient the same will necessarily be increased in the amount required for the meter shaft to be rotated to the number of turns made by the shaft 18 and the amount of liquid loss will thereby be made up during the return of said shaft 34 to rotate at the pace set by shaft 18. If the supply is so as to provide an excess of liquid, then the volume of liquid passed through the meter 33 will necessarily be at a decreasing quantity to return the meter shaft to the speed of the pace set by the shaft 18 and which will likewise make up for the gain in liquid. The limit switches of component unit 11 are interlocked with the similar switches of the component unit 11' whereby both component units will go on recirculation upon failure of liquid flow in either of said component units. A manually operable switch 61 is also provided for placing the component unit 11 in and out of operation and lights 62, 63 normally inactive are controlled by switches 57 and 58 to indicate the type of flow failure.

Upon failure of the supply limit switch 59 moves valve 46 to shift valve 45 to recirculation. Valve 44 will be wide open. Then upon return of the liquid from the supply, the meter 33 will be actuated by the liquid passing therethrough and the wide open valve 44 to start the shaft 29 to return. As this starts to return valve 46 shift valve 45 to on stream position so that by the time the shaft 28 has reached a balance with shaft 27 the lost volume will have been restored.

The apparatus is also provided with an arrangement whereby a test run may be made without passing any liquid through the apparatus, thereby avoiding waste of material. Each test run may be made for a predetermined period and automatically come to rest when the test has been completed. To this end, each component unit is provided with a counter 64 having a re-set feature whereby the counter may be set to zero reading such as at any time after a test run has been completed. Motion from the shaft 18 is transmitted to the shaft of the counter by means of a suitable shaft and gearing designated generally 65. There is also provided a clutch connection designated generally 66 which is normally in driving relation with the counter 64 and is moved in and out of driving relation by means of a shaft 67 common to all units 11,11' and having clevis thereon extending into engagement with the clutch 66. Rocking of said shaft 67 will move the said clutch 66 into or out of driving relation, depending upon the direction of rocking of said shaft 67. The shaft is rocked by means of an air cylinder 68 controlled by solenoid-operated valve 69. Air is furnished to the cylinder 68 through the valve 69 by means of a suitable branch line 70 connecting with the air line 48.

The various instruments, devices, and the controls therefor, heretofore described, are preferably mounted on a master panel 71 and component panels 72, 72' (see Figs. 1 and 2). The motor 12 and rate controller 14 are suitably supported on a frame 73 forming part of the master panel 71. The motor 12 is set into motion by means of a magnetic motor starter 74. The rate controller or integrator 14 is adjusted by means of a manually operated mechanism designated generally 75 secured to the panel 71 and having a shaft 76 (see Figure 3) journalled in a bearing support 77 having a plate 78 secured in position on the front of panel 71. The shaft 76 extends through the plate 78 and has attached thereto a hand wheel 79 for manually turning the shaft 76. Sprocket wheels 80, 81 are mounted on the shaft 76 and the wheel 81 is connected by means of a sprocket chain 82 (see Fig. 2) to a sprocket wheel 83 fixed to the control shaft 84 of the integrator 14 turning shaft 84 which will adjust the output speed of the said integrator 14. An indicator 85 is mounted on the plate 78 to be viewed from the front of the panel 71 (see Fig. 1) and its shaft (see Fig. 2) has a sprocket wheel 86 attached thereto and connected to the sprocket 80 by a chain 87. The indicator 85 may be calibrated in such a manner that upon turning of the shaft 76 the setting of the integrator 14 will be shown and thereby the speed of the output shaft 15.

The bevel gear drive 19 and the ratio controller or integrator 16 of unit 11 are mounted on the frame of panel 72 (see Figs. 2 and 6). In practice, the shaft 15 for assembly reasons is made in sections 15 which are joined by universal connection 15a. The integrator 16 is also controlled by a mechanism designated generally 88 (Fig. 6) having a shaft 89 journalled in a bearing support 90 having a plate 91 attached to the front of the panel. The shaft 89 has a hand wheel 92 thereon and extends to be connected to the control 93 of the integrator 16. The mechanism 88 also includes an indicator 94 on the shaft of which a sprocket wheel 95 is attached. A sprocket wheel 96 is carried by shaft 89 and a chain 97 is trained over said sprocket wheels 95, 96 whereupon rotating of said shaft 89 causes said indicator to be operated to indicate the setting of said integrator. The indicator may be calibrated to indicate in percentage the ratio of the setting of the integrator 16 to the master shaft 15. The differential 20 is also mounted on the panel 72 and in the practical construction of the apparatus is shown connected to the output of the integrator 16 by means of shaft portions 18, 27 connected to each other by a clutch 32. The other primary shaft of the differential may be connected to the connection 35 by shaft 28 including clutch 36. The clutches 32 and 36 are simultaneously controlled from the front of panel 72 by means of a shaft 38 (Fig. 6) having a handle 105 for manually turning the same. A lever 106 (see Figure 8) is mounted to rotate with the shaft 38 and a similar lever 106a is mounted for free pivotal action as at 107. A pair of links 108 are pivotally attached to the free ends of the levers to engage the clutches 32 and 36 and lift the same out of driving relation with the shaft portions 18 and 28 when said shaft 38 is moved in one direction. Upon movement of the shaft 38 in the other direction, the links 108 will be moved generally vertically in a downward direction to permit the said clutches 32 and 36 to move by the action of gravity into driving relation with the shaft portions 18, 28. The shaft 38 also upon rotation from one position to another controls the air valve 109 (Fig. 7) to cut off the air supply to the air operated controller 53 whenever the clutches 32 and 36 are disengaged. A lever 110 is secured to the shaft 38 and depends therefrom and is provided with a pin 111 at the free end thereof. A lever 112 having a forked end 113 extending into engagement with the pin 111 is pivoted as at 114 to a bracket 115 on the body of the valve 109 and is pivotally joined at the other end to the plunger 116 of the valve 109. Upon rotation of said shaft 38, lever 110 will turn lever 112 about pivot 114 to move plunger 116 to operate said valve 109.

The counter 64 of component unit 11 is mounted on the panel 72 to be viewed from the front thereof and is connected to a primary shaft 20 of the differential 20, as by means of a flexible connection 117 (see Figs. 2 and 5). The clutch 66 is mounted within the housing of the counter and the clutch-operating shaft 67 is connected to the air cylinder 68 as by means of a clevis 118 (Fig. 2) carried by the shaft 67 and pivotally secured to the plunger 119 of the air cylinder 68. The instruments, device and controls of unit 11' are likewise mounted on panel 72'. The electric and branch circuits are controlled by a main master switch 120 which has five different settings (not shown) for providing five different operations of the apparatus. There are off, drive, test, blend, and flow back positions. Each component unit 11, 11' also has a switch 61, 61' respectively, for placing said components in and out of operative position.

*The operation of the apparatus*

Assuming a new formulation of compound to be made, the operator turns master switch 120 to the "drive" position illuminating the left light 123 on panel 71 and starting motor 12 which operates line shaft 15 through variable speed controller 14. The components required in the blend are then selected by turning pistol grip switches 61 and 61' which start the pumps 43 and 43' setting up a recirculation of the respective components through the air eliminators 50 and 50', control valves 44 and 44', meters 33 and 33', recirculation valves 45 and 45', and conduits 47 and 47'. The object of this recirculation procedure at this point is to eliminate all air from the system so that metering errors will not be caused when the system is finally put "on stream." The fact that these switches have been properly set is indicated by the illumination of supervisory signal lights 62, 62', 63, and 63' at the head of each component panel 72 and 72'. Master rate controller 14 is now set to the rate of speed corresponding to the desired rate of delivery of total finished product and component ratio controllers 16 and 16' are set to produce the percentage required of the fluid controlled by each component unit 11 and 11'. Pistol grips 105 and 105' are now engaged connecting pacing and metering elements to differentials 20 and 20'. At this point totalizers 64 and 64' are not yet connected into the system because clutches 66 and 66' are not yet engaged. The operator allows pointers 125 and 125' to come to the set point before taking the next step.

It will be noted that at this point in the procedure the purpose for recirculating each component is to allow the individual control valves 44 and 44' to reach whatever positions are required to produce the flows demanded; this condition exists only when the pointers 125 and 125' on the air controllers 53 and 53' are at their set points. The set point of the pointers 125 and 125' which are directly connected to secondary shafts 29 and 29' of differentials 20 and 20' will always be the same regardless of the positions required of the control valves 44 and 44' as the controllers 53 and 53' are of the "floating" type as distinguished from the proportional type in which a different position of the pointer is required for every different position of the flow control valves 44 and 44'.

The totalizers 64 and 64' are reset to zero before switch 120 is moved to the "test" position. When switch 120 is moved to the test position, the middle light 123 is illuminated and the left light is extinguished. The totalizers are simultaneously clutched into the system by air cylinder 68 and a preliminary run is made with all components in recirculation through air eliminators 50 and 50', valves 44 and 44', meters 33 and 33', 3-way valves 45 and 45', and conduit 47 and 47'.

Timer 122 presets the duration of the test run and on completion of this period totalizers 64 and 64' are automatically de-clutched by air cylinder 68. At the end of the test period the figures shown by the totalizers 64 and 64' will immediately enable the operator to check the percentages set on ratio controllers 16 and 16' because the totalizers 64 and 64' when added together and the individual totals divided by the sum of the two will give percentages which can be checked against the respective handwheel settings. Furthermore, the aforementioned sum will also give a check on the setting of ratio controller 14. It shall be borne in mind that totalizers 64 and 64' actually read total flow through meters 33 and 33' during the test run. If the totals shown by the individual totalizers are as set on the ratio controllers 16 and 16', the operator then manually resets the totalizers. However, if electrically reset totalizers are employed, an additional position is provided on switch 120 marked "totalizer reset," and the operator would move the switch to this position before moving to the next position which is blend.

The moment the operator moves switch 120 to the blend position he illuminates the right hand light 123 on the master control panel 71 and extinguishes the center light, which automatically trips recirculation valves 45 and 45' to a position which closes recirculation conduits 47 and 47' and opens the connections 60 and 60' to the blend manifold. Simultaneously with the tripping of the 3-way recirculation valves, the totalizers 64 and 64' are clutched into the system so that totals appearing during and at the completion of the run will correctly report total quantities of each component in the finished product.

Should any component supply to the system fail to correspond exactly to the demands set up by shafts 18 and 18', the secondary shafts 29 and 29' of the differentials 20 and 20' together with pointers 125 and 125' will be displaced from their set point positions until contacts 58 and 58' are closed. Closing of the contacts 58 and 58' immediately de-clutches totalizers 64 and 64' by energizing air cylinder 68 and at the same time trip recirculation valves 45 and 45' so as to throw the entire blender on recirculation until the difficulty has been corrected. On restoration of the flow which failed, the apparatus will automatically return to service and counters 64 and 64' are simultaneously reclutched along with tripping of valves 45 and 45' from recirculation to blend. At that time pointers 125 and 125' will be displaced by an angular amount from the set point and control valves 44 and/or 44' will be wide open calling for fluid. Meters 33 and 33' will therefore have to run ahead in order to bring arm 125 back to its set point thereby making up the shortage which occurred in cutting the machine off the line. At the completion of a blending operation the master control switch 120 may be turned to the "off" position after shutting off the component pumps 43 and 43' by turning switch 61 and 61' and de-clutching the differentials by turning pistol grips 105 and 105'. This puts the blender completely out of service. In the event that a change in formulation of the blend is to be made and operations are to be continued the main switch 120 is turned to drive, at which time all components are put back into recirculation through valves 44 and 44', meters 33 and 33', 3-way valves 45 and 45', and conduits 47 and 47', and at the same time the totalizers are de-clutched. At this point the operator manually resets the totalizers 64 and 64' to zero and resets the ratio controllers 16 and 16' to the new percentage values required for the new product. He may also reset master rate controller 14 in the event a new rate of end product flow is desired. In the event that the product has previously been made and calibrations of ratio controllers 16 and 16' have already been established, there is no necessity for going through the test position and the operator may turn switch 120 through the test position and go directly on blend. However, should he so desire, he can pre-test the blend as previously described.

Should the change in formulation require a new component not previously in the system, he will turn the master switch 120 back to drive and then turn pistol grips 61 and/or 61' to the blow-back position. This will automatically stop pump 43 and/or 43' and open 3-way valves 51 and/or 51', admitting compressed air to the air eliminator which is the high point of the recirculation system. The air will drive the previous fluid out through conduits 42 and 47 back to the supply source. A new fluid is then connected to the system and pistol grips 61 and/or 61' are turned from blow-back to the "on" position, starting pump 43. The new fluid is then delivered through the air eliminator 50 and 50' and through the recirculation conduit 47 and 47'. The recirculation will continue until the float in the air eliminator 50 closes 3-way valves 51 and/or 51'. At that point light 124 or 124' is illuminated, indicating that blow-back has been completed. The operator can then proceed to his test run and to blend as hereinbefore described.

I claim:

1. An apparatus for proportioning the flow of a plurality of liquids to be combined comprising a master power pacing constant rate rotative member, the speed of which is unity for the volume of the combined liquids at any instant during operation, a plurality of flow lines and a ratio control for each flow line responsive to changes in the speed of the pacing member and adjustable to predetermine the volume of the flow of liquid through each flow line in definite proportions to the speed of said rotative power pacing member at any instant during operation and a differential means for each flow line responsive to the speed of the ratio controller and the volume of liquid moving through said flow line for controlling the flow of said liquid at a ratio governed by said ratio controller, and means for recirculating the liquid in a portion of each individual flow line upon a failure of flow in any flow line.

2. An apparatus for proportioning the flow of a plurality of liquids comprising a master power pacing constant rate rotative member, the speed of which is unity for the volume of the combined liquids at any instant during operation, a plurality of flow lines, a ratio controller for each flow line responsive to change in the speed of the pacing member and adjustable to predetermine the volume of the flow of liquid through each flow line in definite proportion to the speed of said power pacing force at any instant during operation, a counter for each flow line for indicating the proportion of the individual volume of the flow of liquid in each flow line in relation to the speed of the pacing member, means for recirculating the flow of liquid in a portion of each flow line upon a failure of flow in any flow line, and means automatically operable for disconnecting all of said counters upon the said recirculation of said liquid and operable to automatically re-engage said counters upon said failure of flow having been corrected.

3. An apparatus for proportioning the flow of liquids comprising a master constant rate motor, a rotatable member in the line of flow of each of a plurality of liquids adapted to produce for a unit volume of flow of liquid a definite angular movement of the rotatable member, a valve for controlling the flow of liquid to said rotatable member, a differential having two primary shafts and one secondary shaft movable upon a difference in rotation of said primary shafts, a power transmitting means between said motor and said differential for rotating a first primary shaft of said differential at a constant speed, a ratio controller adjustable to control the speed of said transmitting means in definite proportion to the speed of the motor at any instant during operation, a second power transmitting means between said rotary member and said differential to rotate the second primary shaft thereof, and means actuated by the secondary shaft of said differential to instantaneously operate said valve to control the flow of liquid to said rotatable member to rotate said second primary shaft at a speed equal to the said first primary shaft, a counter for each flow line connected to said power transmitting means, and clutch means between the first said power transmitting means and said first primary shaft whereby said transmitting means and first primary shaft may be disconnected and the accumulated readings of said counters may be compared to the speed of the pacing member without the passing of liquid through said flow lines.

4. An apparatus as set forth in claim 3 wherein an adjustable master rate controller of the infinitely variable stepless integrator type is provided for controlling the speed of the master power source.

5. An apparatus for controlling a flow of liquid, a line of flow for said liquid, a master constant rate rotative power source, a rotatable member in said line of flow adapted to produce for a unit volume of flow of liquid a definite constant angular movement of said rotatable member, a recirculating flow line connected to said line of flow on the output side of said rotatable member, said recirculating flow line including the portion of said line of flow through said rotatable member, a first valve for controlling the flow of liquid to said rotatable member, a second valve for controlling the flow of liquid from said rotatable member and to said recirculating flow line, a differential, a power transmitting means between said rotative power source and said differential to rotate a first primary shaft thereof at a constant rate, a ratio controller adjustable to control the speed of said transmitting means in definite proportion to the speed of the master power source, a second power transmitting means between said rotary member and said differential to rotate a second primary shaft thereof, means actuated by a secondary member of said differential to operate the said first valve to control the flow of liquid to said rotatable member to rotate said second primary shaft at a speed equal to the said first primary shaft, and limit means operable upon movement of said secondary member to operate said second valve to open said recirculating flow line to the flow of liquid upon failure of the flow in the said first flow line.

6. An apparatus as set forth in claim 5 in which said second valve is electrically operated.

7. An apparatus for proportioning the flow of a plurality of liquids in definite proportions to a unit volume of liquid after combined, comprising a master constant rate rotative power source common to said plurality of flows and the speed of which is unity of volume of the combined flows at any instant during operation, a rotatable member in each line of flow of said liquids adapted to produce for a unit volume of flow of liquid a definite constant angular movement of said rotatable member, a valve for controlling the flow of liquid to each of said rotatable members, a differential having two primary shafts for each line of flow, a power transmitting means between each of said differentials and said rotative power source for rotating a first primary shaft of its respective differential at a constant speed, a ratio controller for each of said power transmitting means adjustable for controlling the speed of rotation of each of said first primary shafts in definite proportion to the speed of the master power source, a second power transmitting means between each rotatable member and its respective differential to rotate the second primary shaft thereof, and means actuated by a secondary shaft of each of said differentials to operate the said valve in its respective flow line to instantaneously control the flow of liquid to its rotatable member to rotate the said second primary shaft of its respective differential at a speed equal to the said first primary shaft of said differential and clutch means between said differential and said power transmitting means whereby said power sources may be placed in operation prior to the connection thereof to said differentials.

8. An apparatus as set forth in claim 7 in which a counter is provided for each ratio controller to indicate the speed of rotation of the power transmitting means controlled thereby.

9. An apparatus for controlling the flow of a plurality of liquids in definite proportions to a unit volume of liquid after combined, comprising a master constant rate rotative power source providing a pacing system, the speed of which is unity of volume at any instant during operation, a rotative member in each flow line adapted to produce for a unit volume of flow of liquid a definite constant angular movement of said rotatable member, an air-operated valve in each of said flow lines, a differential for each line of flow, a power transmitting means between each differential and said rotative power source for rotating a first primary shaft of each differential at a constant speed, a ratio controller for each of said transmitting means adjustable for controlling the speed of rotation thereof in definite proportions to the speed of the pacing system, a second power transmitting means between each of said rotatable members and its differential for rotating the second primary shaft of its respective differential, an air controller for each flow line actuated upon movement of a secondary member of each differential to operate the valve controlled thereby to control the flow of liquid through each rotatable member to rotate the said second primary shaft of its respective differential at a speed equal to the speed of the first primary shaft of said differential, means for recirculating the liquid in a portion of each flow line upon failure of any flow line and upon failure in the air line.

10. In an apparatus for controlling the flow of a plurality of liquids, a plurality of flow lines for said liquids, a recirculating line in each of said flow lines, air-operated valve for controlling each of said flow lines and its respective recirculating line, said valves being normally opened for the flow of liquid through said flow lines and closed to the flow of liquid through said recirculating lines, a solenoid for controlling each of said valves, electrical means actuated upon a failure of any of said flow lines to energize all of said solenoids to close said valves to the flow of liquid through said flow lines and open said valve to the flow of liquid through said recirculating lines, said electrical means operating to automatically re-establish the flow through all of said flow lines upon the correction of said failure and means responsive to a failure in the air supply to any of said valves for closing all of said valves to the flow of liquid through said flow lines and to open said valves to the flow of liquid through said recirculating lines.

11. An apparatus for proportioning the flow of a plurality of materials comprising an adjustable master power pacing constant rate rotative member, the speed of which is unity for the volume of the combined liquids at any instant during operation, a plurality of flow lines, a shaft rotatable to operate each flow line, a ratio control device for each flow line driven from said rotative member and adjustable to deliver to its shaft a desired fraction of the speed of said rotative member, means controlled by each shaft for delivering a volume of liquid proportional to the speed of the shaft by the total of the liquids delivered adding to unity represented by the speed of the rotative member, a clutch interposed in each shaft between said control device and said means, a counter driven by each shaft on the control device side of the clutch whereby disconnecting the clutch causes operation of the counters without delivering material.

12. An apparatus for proportioning the flow of a plurality of materials comprising a plurality of supply lines, a rotatable member in each supply line adapted to produce a definite angular movement in response to unit volume of flow through said line, a valve for controlling the flow to each rotatable member, a valve on the delivery side of each member to control the delivery thereof to the blended mass, a differential for each line having two primary shafts and one secondary shaft movable upon the difference of rotation of said primary shafts, a power transmitting means for rotating one primary shaft at a constant speed, said rotatable member connected to drive the other primary shaft, an instantaneous controller for adjusting the position of the first said valve for the flow to the rotatable member responsive to the position of the secondary shaft of said differential, means also operated by said secondary shaft to control all of the valves on the delivery side of said members upon failure of the supply through any one of the supply lines.

13. An apparatus as in claim 12 wherein the last said means restores each of the last said valves to its prior position upon curing of the failure of said supply line.

RUDY P. LOWE.

References Cited in the file of this patent
UNITED STATES PATENTS

| Number | Name | Date |
|---|---|---|
| 2,009,622 | Kennedy | July 30, 1935 |
| 2,024,478 | Short | Dec. 17, 1935 |
| 2,024,480 | Short | Dec. 17, 1935 |
| 2,203,980 | Burt | June 11, 1940 |
| 2,207,809 | Lauffer et al. | July 16, 1940 |